(12) United States Patent
Cygan et al.

(10) Patent No.: US 10,173,102 B2
(45) Date of Patent: Jan. 8, 2019

(54) BACK MACHINE

(71) Applicant: GYMBOT, LLC, Lake Zurich, IL (US)

(72) Inventors: Brian Cygan, Wauconda, IL (US); J. P. Stockton, Rochester, MN (US); Clay J. Steffee, Alexandria, KY (US)

(73) Assignee: GYMBOT, LLC, Lake Zurich, IL (US)

( * ) Notice: Subject to any disclaimer, the term of this patent is extended or adjusted under 35 U.S.C. 154(b) by 158 days.

(21) Appl. No.: 15/260,290

(22) Filed: Sep. 8, 2016

(65) Prior Publication Data

US 2017/0065852 A1    Mar. 9, 2017

Related U.S. Application Data

(60) Provisional application No. 62/215,652, filed on Sep. 8, 2015.

(51) Int. Cl.
| | |
|---|---|
| *G09B 5/02* | (2006.01) |
| *A63B 21/00* | (2006.01) |
| *A63B 21/22* | (2006.01) |
| *A63B 23/02* | (2006.01) |
| *A63B 24/00* | (2006.01) |
| *A63B 21/008* | (2006.01) |
| *G09B 19/00* | (2006.01) |

(Continued)

(52) U.S. Cl.
CPC ...... *A63B 24/0087* (2013.01); *A63B 21/0087* (2013.01); *A63B 21/4033* (2015.10); *A63B 21/4047* (2015.10); *A63B 23/0238* (2013.01); *G09B 5/02* (2013.01); *G09B 19/00* (2013.01); *A63B 21/0058* (2013.01); *A63B 21/0552* (2013.01); *A63B 21/0628* (2015.10); *A63B 21/159* (2013.01); *A63B 21/225* (2013.01); *A63B 21/4034* (2015.10); *A63B 21/4035* (2015.10); *A63B 23/03525* (2013.01); *A63B 71/0622* (2013.01); *A63B 2069/0062* (2013.01); *A63B 2220/51* (2013.01); *A63B 2225/09* (2013.01); *A63B 2225/093* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,542,900 A | * | 9/1985 | Ray ................... | A63B 23/0494 482/101 |
| 4,776,587 A | | 10/1988 | Carlson et al. | |

(Continued)

*Primary Examiner* — Sundhara M Ganesan
*Assistant Examiner* — Shila Jalalzadeh Abyaneh
(74) *Attorney, Agent, or Firm* — Loza & Loza, LLP; Heidi L. Eisenhut (57) ABSTRACT

The exercise machine in the present disclosure utilizes novel machine mechanics that accommodate and adjust to the spines shifting axis of rotation. Through the use of a multiple, articulating axes a back exercise machine or device that promotes pure and isolated spinal flexion and extension with no need for mechanical anatomical restraint to succeed has been created. Using these mechanics when users attempt to extend their trunk, the device adjusts to the natural shifting axis of rotation of the spine thereby dis-involving the contribution of the hip extensor muscles. In other works, the exercise back machine of the present disclosure is designed to accommodate the complex biomechanics of the spine and to facilitate targeted strengthening of the spinal erectors and deep intrinsic spinal muscles.

20 Claims, 7 Drawing Sheets

(51) Int. Cl.
    *A63B 69/00*           (2006.01)
    *A63B 71/06*           (2006.01)
    *A63B 23/035*          (2006.01)
    *A63B 21/005*          (2006.01)
    *A63B 21/055*          (2006.01)
    *A63B 21/062*          (2006.01)

(56) References Cited

U.S. PATENT DOCUMENTS

| | | | | |
|---|---|---|---|---|
| 5,269,738 | A | * | 12/1993 | Boren .............. A63B 23/0233 |
| | | | | 482/100 |
| 5,316,534 | A | * | 5/1994 | Dalebout ......... A63B 21/00072 |
| | | | | 482/130 |
| 5,409,438 | A | | 4/1995 | Jones et al. |
| 6,361,482 | B1 | | 4/2002 | Batca et al. |
| 7,537,551 | B2 | | 5/2009 | Steffee |
| 7,563,209 | B2 | | 7/2009 | Webber et al. |
| 2007/0225129 | A1 | | 9/2007 | Maresh |
| 2008/0085822 | A1 | * | 4/2008 | Webb ............... A63B 23/0222 |
| | | | | 482/140 |

\* cited by examiner

BACK MACHINE

CROSS REFERENCE TO RELATED APPLICATIONS

This application claims priority to a provisional application, U.S. Ser. No. 62/215,652, filed Sep. 8, 2015, entitled BACK MACHINE, which is hereby incorporated by reference.

FIELD

The present invention relates to an exercise machine and more particularly a back machine that fosters and facilitates isolated spinal flexion and extension exercise for the effective muscular loading of muscle that flex and extend the spine.

BACKGROUND

Back pain is the number one cause of disability in industrialized nations. Research indicates that 80% of people in the United States will experience back pain at some point in their lives. While much back pain spontaneously subsides within 45 days of acute onset, pain which lasts more than 45 days is chronic due to the increases in difficulty ameliorating this pain. Furthermore, research has indicated then for prevention and reduction of chronic pain, isolated strengthening of the lumbar musculatures is vital. In some studies there has been more than an 80% success rate at reducing pain that is chronic following a course of intensive and isolated lumbar strengthening. These results are irrespective of pathological diagnoses as long as the diagnoses are not absolute contraindication for back exercise. Research indicates that devices which do not promote isolated lumbar motion may not be effective at providing strengthening benefits.

Typical back machines do not facilitate lumbar muscle exercise due to incongruent mechanics between the device itself and human users. In particular, typical back machines only have a single machine axis which is adequate if the machine is trying to accommodate the biomechanics of the elbow or the knee which has a simple axis. However, a single axis machine does not accommodate or encourage the spine to flex and extend when loaded and instead the torso simple rotates around the hip. Furthermore, typical back machines use very uncomfortable skeletal restraints to prevent the pelvis from of the user from rotating and thereby forces the spine to flex and extend.

Additionally, typical back machines rotate around a single axis or point like an oval or a circle. The machine rotates around that axis as in a circle, but that path of motion that is created is not congruent with spinal mechanics and as a result it inappropriately encourages the torso of the user to simply rotate around the hip joint circumventing the spinal function that is desirable.

Figure 1A:
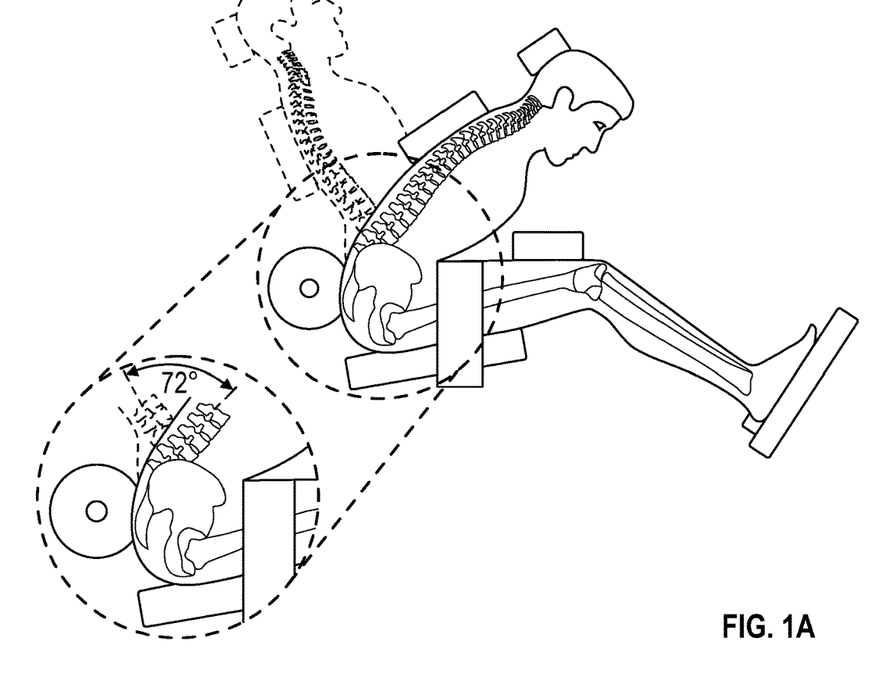
FIGS. 1A and 1B illustrate a typical lumbar extension machine.
Figure 1B:
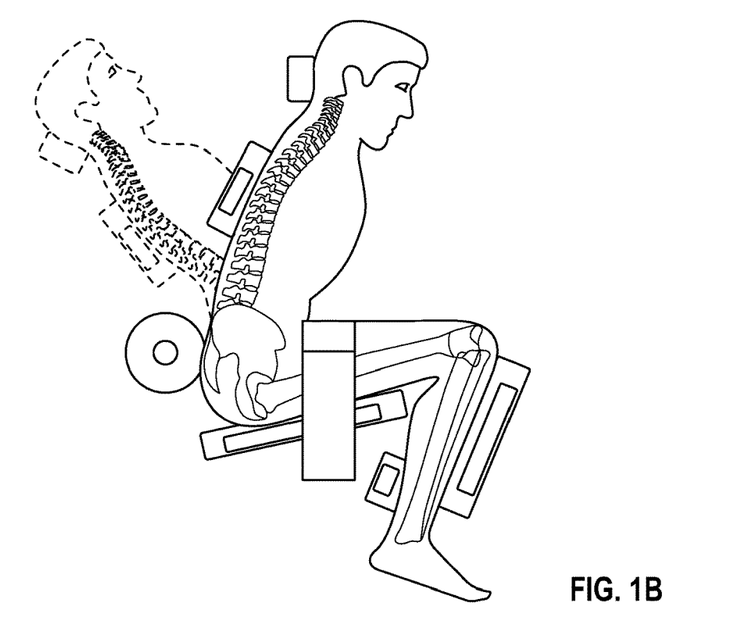

An example of a machine which has been shown to effectively promote lumbar strengthening have incorporated elaborate and uncomfortable skeletal restraint mechanisms to essentially wrestle the user's anatomy into compliance with some degree of spinal motion and muscular loading is illustrated in FIGS. 1A and 1B.

In addition to the machine in FIGS. 1A and 1B being intimidating and uncomfortable these types of machines are very expensive (e.g. $40,000) making them effective but impractical.

In view of the above, what is needed is a back machine that utilizes three axes of rotation that work together in concert to offer a biomechanically adaptive work arm which enables the multi-segmental spine of a user to flex and extend and accommodates the radical shifts in virtual axes of motion about the spine by encouraging or allowing true spinal flexion and extension without the skeletal restraint. In other words, a back machine that fosters and facilitates isolated spinal flexion and extension exercise for the effective muscular loading of muscles that flex and extend the spine is needed.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one aspect, a back exercise machine is provided. The back exercise machine comprises a main frame having a base section; a user support mounted on the main frame, the user support comprising a seat frame having a seat pad secured thereon; a back frame mounted on the main frame and connected to the user support; and a resistance assembly mounted on the main frame and connected to the back extension assembly for producing multiaxial movement of the back extension assembly.

The back frame comprises a first vertical support member extending vertically upward from the base section; a second vertical support member extending vertically upward from the base section; and a back frame cross member connecting upper ends of the first and second vertical support members.

The back extension assembly comprises a first arm pivotally mounted to the upper end of the first vertical support member; a second arm pivotally mounted to the upper end of the second vertical support member, the first and second arms connected by a back extension horizontal member and pivotally rotate around a first pivot axis; a first side plate pivotally mounted to a first end of the first arm; a second side plate pivotally mounted to a first end of the second arm, the first and second side plates rotate around a second pivot axis; a first supporting plate pivotally mounted to a second end of the first side plate; a second supporting plate pivotally mounted to a second end of the second side plate; and a back support horizontal member connecting the first and second supporting plates, the first and second supporting plates rotate around a third pivot axis.

According to one feature, the base section comprises first, second and third parallel base struts connected by a first cross member; a first connecting member extending at an angle from an end of the first base strut to the second base strut; and a second connecting member extending at an angle from an end of the third base strut to the second base strut.

According to another feature, the first and second vertical support member extend upwardly from the first cross member of the base section.

According to yet another feature, the machine further comprises a foot support frame mounted to a front end of the second base strut. The foot support frame comprises an elongated column extending rearwardly and upwardly from the front end of the second base strut; and a plurality of foot restraining roller extending perpendicularly outward from opposing side of the elongated column.

According to yet another feature, first side plate includes a slot adapted to receive a protrusion extending outwardly from the first arm of the back extension assembly, the protrusion moves within the slot allowing the first side plate to pivotally rotate around the second pivot axis.

According to yet another feature, the second side plate includes a slot adapted to receive a protrusion extending outwardly from the second arm of the back extension assembly, the protrusion moves within the slot allowing the second side plate to pivotally rotate around the second pivot axis.

According to yet another feature, the first supporting plate includes a slot adapted to receive a protrusion extending outwardly from the first side plate of the back extension assembly, the protrusion moves within the slot allowing the first supporting plate to pivotally rotate around the third pivot axis.

According to yet another feature, the second supporting plate includes a slot adapted to receive a protrusion extending outwardly from the second side plate of the back extension assembly, the protrusion moves within the slot allowing the second supporting plate to pivotally rotate around the third pivot axis.

According to yet another feature, the resistance assembly comprises a linear actuator having a cylinder and a piston axially engaged with the cylinder; a motor secured to, and in electrical communication with, the linear actuator; and wherein the piston is attached to a lever connected to the first arm of the back extension assembly.

According to yet another feature, the machine comprises a display support member mounted to the elongated column member of the foot support frame; and a display secured to the display support member.

According to yet another feature, the seat frame includes a first seat support member, having a first end and a second end, extending upwardly and outwardly from the main frame where the first end is mounted to the main frame and the second end it mounted to the back frame; and a second seat support member extending outwardly from the first seat support member, the seat pad mounted on the second seat support member.

According to yet another feature, the second seat support member is adjustable along the length of the first seat support member.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION OF THE INVENTION

In the following description, specific details are given to provide a thorough understanding of the embodiments. However, it will be understood by one of ordinary skill in the art that the embodiments may be practiced without these specific details.

Specific Biomechanics

Humans possess thirty three (33) articulating spinal vertebrae named for their specific spinal region. The human frame is designed to rotate around each of these vertebrae under active or passive forces which means the spine is unique in its anatomical actions. While other joints act like more simple hinges (knee) or like a ball and socket (shoulder) the spine is capable of snake like motions and simultaneous movement about its many articulation creates an axis of motion that shifts perpetually throughout any motion to a degree that make proper exercise machine designs problematic.

Currently exercise machines are designed to rotate around a single axis of rotation. This works just fine as long the body joint involved in a particular exercise rotates more or less around a fixed bodily axis of rotation. In this scenario co-axial alignment of machine and body joint creates an ergonomically appropriate environment for muscular loading. However, as mentioned previously, the spine does not rotate around a single joint and so a fixed axis of rotation device of conventional back exercise machines is not appropriate. To date, prior to this disclosure, this is the only type of spinal exercise device available. Research shows the conventional back exercises and machines are ineffective because of their inability to isolate spinal extensors. In fact, these typical back exercises do more for the glutes than they do the spine.

To overcome the problems with the prior art exercise back machines, the exercise back machine in the present disclosure utilizes novel machine mechanics that accommodate and adjust to the spines shifting axis of rotation. Through the use of a multiple, articulating axes a back exercise machine or device that promotes pure and isolated spinal flexion and extension with no need for mechanical anatomical restraint to succeed has been created. Using these mechanics when users attempt to extend their trunk, the device or exercise back machine adjusts to the natural shifting axis of rotation of the spine thereby dis-involving the contribution of the hip extensor muscles. In other works, the exercise back machine of the present disclosure is designed to accommodate the complex biomechanics of the spine and to facilitate targeted strengthening of the spinal erectors and deep intrinsic spinal muscles. As described in more detail below, the back exercise machine of the present disclosure provides a tri-axial work arm that is built in a biomechanically accommodating or appropriate way along with all the other mechanics of the machine including proper placement of the roller pads on the pelvis, the height of the seat and the foot restraint.

The novel mechanics of the exercise back machine of the present disclosure makes the isolated lumbar extension strengthening possible without the use of any uncomfortable restraint mechanisms. Additionally, the exercise back machine of the present disclosure delivers smart resistance which adapts to each user's ability even as their strength varies. This is important for 2 reasons. First, most individuals are much weaker in extension then they are in flexion and the exercise back machine of the present disclosure conforms to this reality. Second, the exercise back machine of the present disclosure is the first device ever to provide biomechanically correct eccentric loading of the spinal muscles. Most people feel a noticeable improvement in posture and stabilization immediately and in over 8 weeks often gains in strength of 100% or more.

Back Exercise Machine

Figure 2:
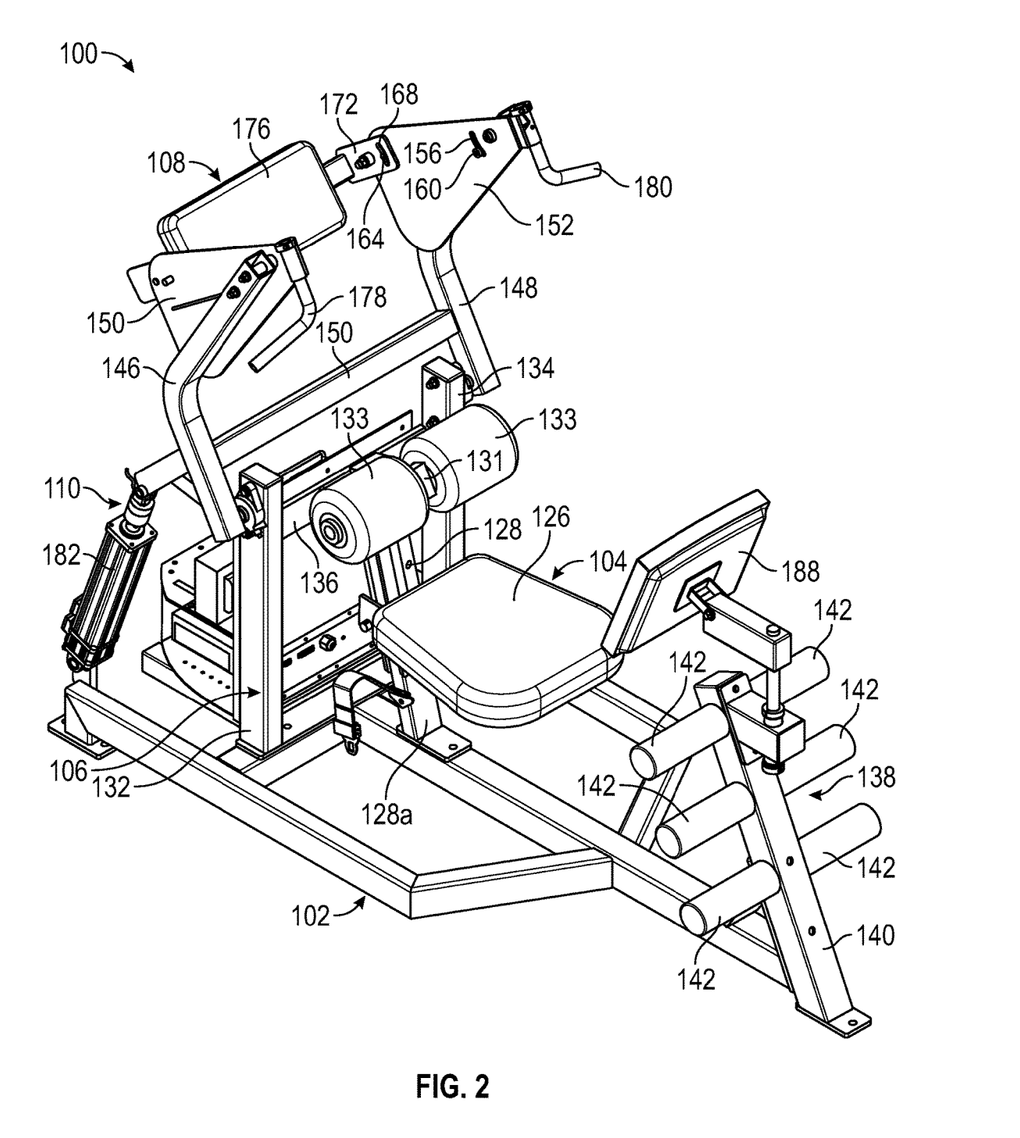
FIG. 2 is a front left perspective view of a back exercise machine according to the present disclosure.
Figure 3:
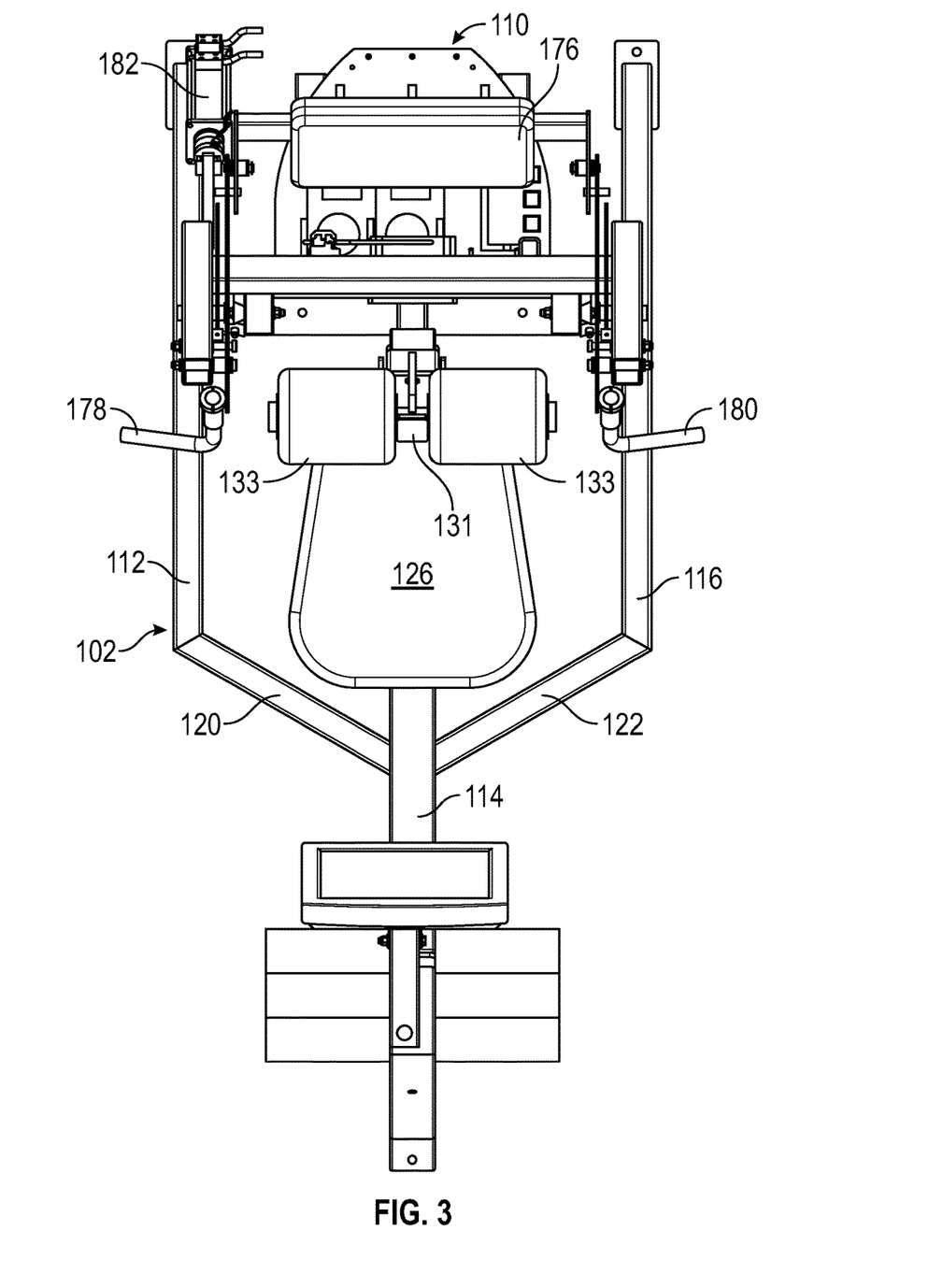
FIG. 3 is a top plan view of the back exercise machine of FIG. 2.
Figure 4:
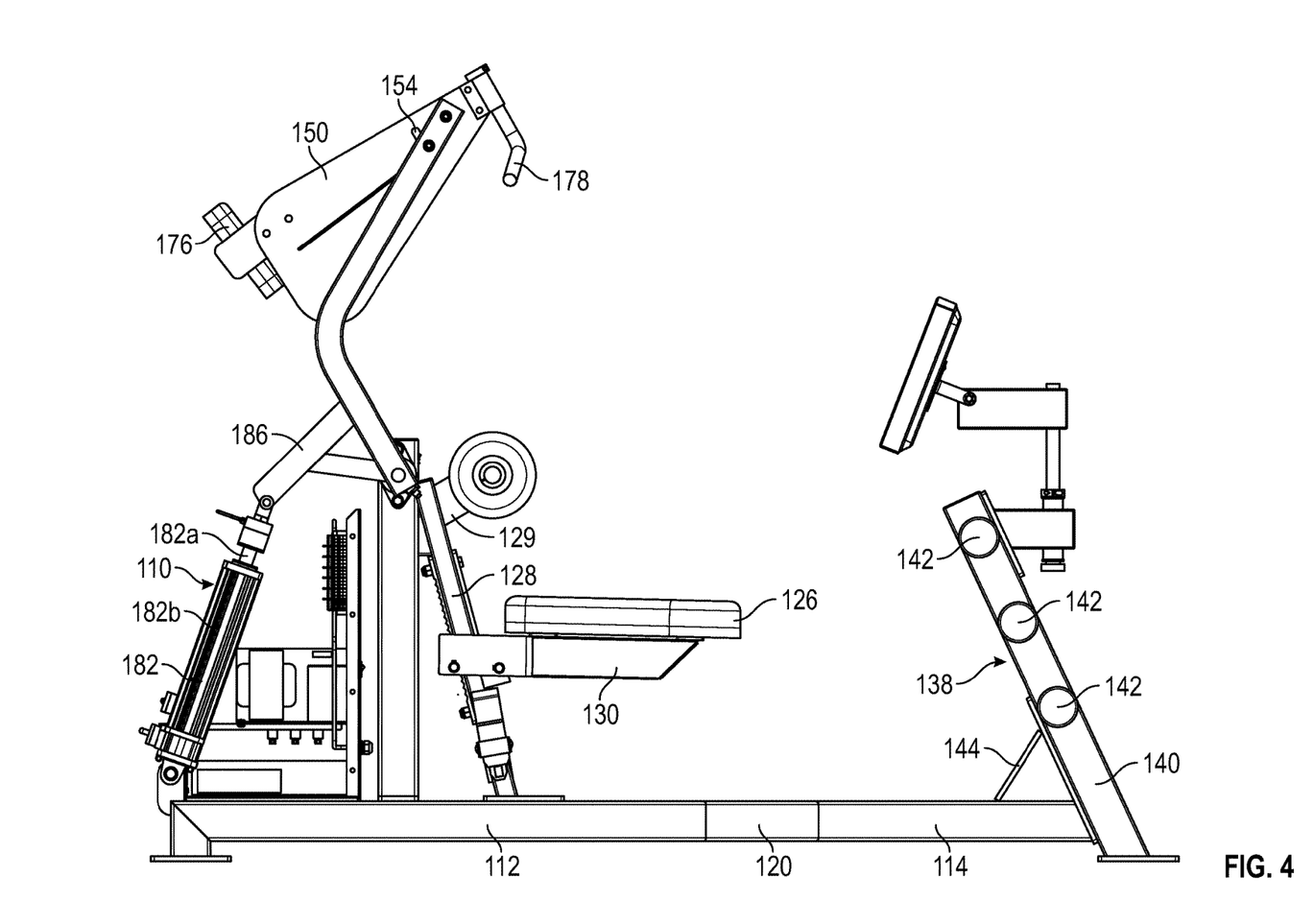
FIG. 4 is a left side elevation view of the back exercise machine of FIG. 2.
Figure 5:
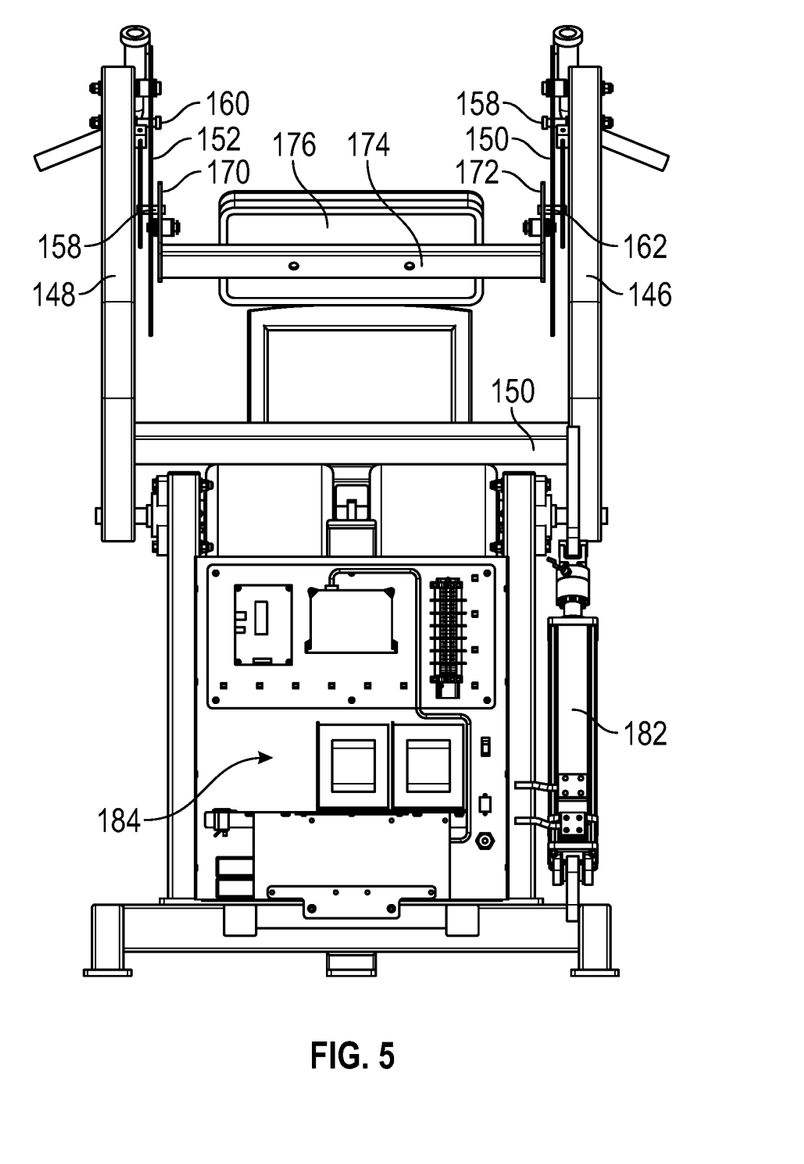
FIG. 5 is a back elevation view of the back exercise machine of FIG. 2.
Figure 6:
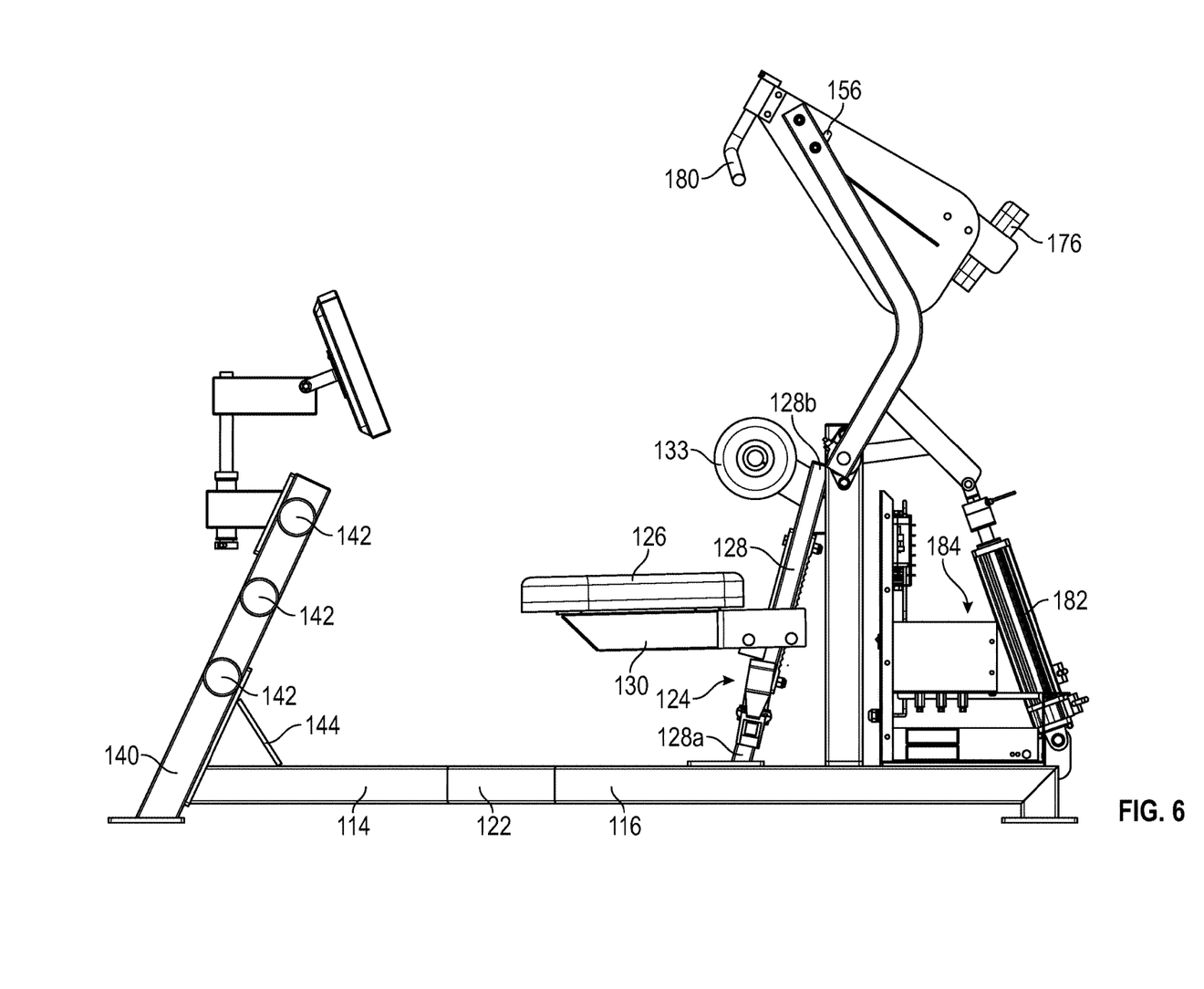
FIG. 6 is a right side elevation view of the back exercise machine of FIG. 2.
Figure 7:
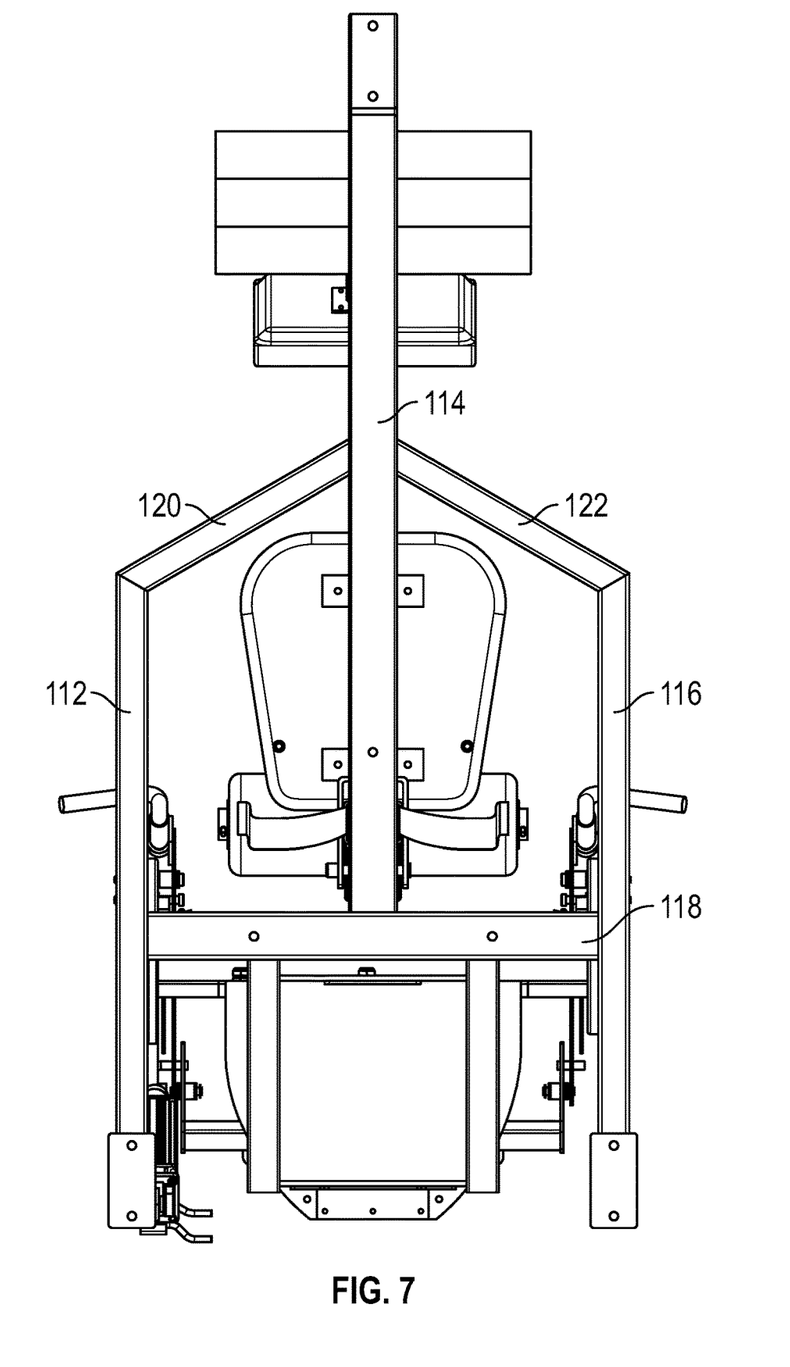
FIG. 7 is a bottom plan view of the back exercise machine of FIG. 2.

FIG. 2 is a front left perspective view of a back exercise machine according to the present disclosure. FIG. 3 is a top plan view of the back exercise machine of FIG. 2. FIG. 4 is a left side elevation view of the back exercise machine of FIG. 2. FIG. 5 is a back elevation view of the back exercise machine of FIG. 2. FIG. 6 is a right side elevation view of the back exercise machine of FIG. 2. FIG. 7 is a bottom plan view of the back exercise machine of FIG. 2. The following discussion refers interchangeably to FIGS. 2-7.

As shown, the back exercise machine 100 includes a main frame 102, a user support 104 mounted on the main frame 102, a back frame 106 mounted to the main frame 102, a back extension assembly 108 secured to the main frame 102 and a resistance assembly 110 pivotally mounted to the main frame 102 and secured to the back extension assembly 108 for producing multiaxial movement of the back extension assembly 108.

The main frame 102 has a base section comprising first, second and third parallel base struts 112, 114, 116 connected by a first cross member 118. The base section further comprises a first connecting member 120 extending at an angle from an end of the first base strut 112 to the second base strut 114 and a second connecting member 122 extending at an angle from an end of the third base strut 166 to the second base strut 114.

The user support 104 has a seat frame 124 with a seat pad 126. The seat frame 124 includes a first seat support member 128 extending upwardly and outwardly from the main frame 102 and a second seat support member 130 extending outwardly from the first seat support member 126. More specifically, the first seat support member 128 has a first end 128a secured to the second base strut 114 and a second end 128b secured to the back frame 106. The second seat support member 130 is adjustable along the length of the first seat support member 128 for varying the height of the seat pad 126 allowing for positioning of various size users. Any adjustment mechanism known in the art may be utilized for adjusting the seat pad 126. A back support member 129 is connected to and extends outwardly from the second end 128b of the first seat support member 128. A horizontal member 131 may be secured to the back support member 129 and include back engaging rollers 133 secured to each end of the horizontal member 131.

The back frame 106 includes first and second vertical support members 132, 134 extending upwardly from the first cross member 118 of the base section and a second cross member 136 extending between upper ends of the first and second vertical support members 132, 134.

The back exercise machine 100 may further include a foot support (or restraint) frame 138 mounted to a front end of the second base strut 114. The foot support frame 138 comprises an elongated column member 140 extending rearwardly and upwardly from the front end of the second base strut 114. A plurality of foot engaging (or restraining) rollers 142 may extend perpendicularly outward from the elongated column member 140. As shown, three foot engaging rollers 142 may extend outwardly from a first side of the elongated column member 140 and three corresponding foot engaging rollers 142 may extend vertically outward from a second opposing side of the elongated column member 142. The foot engaging rollers 142 may be located at various locations on the elongated column member 142 allowing for positioning of feet of various size users. As shown, a bracket 144 may be mounted between the elongated column member 140 and the second base strut 114 for providing support to the elongated column member 140.

The back extension assembly 108 comprises a first arm 146 pivotally mounted to an upper end of the first vertical support member 132 and a second arm 148 pivotally mounted to an upper end of the second vertical support member 134. As shown, the first and second arms 146, 148 may have curved configuration and are secured together by a horizontal member 150. Both the first and second arms 146, 148 may pivotally rotate around a first pivot axis. The first pivot axis formed by the rotation of the first and second arms 146, 148 in relation to the upper ends of the first and second vertical support members 132, 134.

Each of the first and second arms 146, 148 has a first end and a second end. The first ends of the arms 146, 148 are pivotally mounted to the upper ends of first and second vertical support members 132, 134, respectfully, as described above and the second ends of the arms 146, 148 are pivotally mounted to first and second side plates 150, 152 respectively. Each of the first and second side plates 150, 152 may have a generally triangular configuration and include first slots 154, 156 adapted to receive first protrusions 158, 160 extending outwardly from the first and second vertical support members 132, 134. The slots may have a generally curved configuration and the first protrusions 158, 160 move about/within the first slots 154, 156 allowing the first and second side plates 150, 152 to pivotally rotate around a second pivot axis.

Each of the first and second side plates 150, 152 further include second protrusions 162, 164 extending outwardly and adapted to be received in second slots 166, 168 located in first ends of a first supporting plate 170 and a second supporting plate 172. The second ends of the first and second supporting plates 170, 172 are mounted to a horizontal member 174 which includes an upper back support pad 176 mounted thereon. The upper back support pad 176 supports the upper back of a user. The second protrusions 158, 160 on the first and second side plates 150, 152 move about/within the second slots 166, 168 allowing the first and second supporting plates 170, 172 to pivotally rotate around a third pivot axis.

According to one aspect, the first ends of each of the first and second plates 150, 152 may include handles 178, 180 for the user to grip.

As shown, the resistance assembly 110 may comprise a linear actuator 182 and a motor 184, such as an isokinetic motor, for moving a piston 182a of the actuator axially. The cylinder 182b of the actuator 182 is secured to, an in electrical communication with, the motor 184 and the piston 182a is attached to a lever 186 connected to the first arm 146. When the piston 182a acts on the lever 186 it causes the first and second arms 146, 148 to rotate about the first pivot axis. Although the resistance assembly 110 is illustrated as a motor, this is by way of example only. The resistance assembly 100 can be formed of gravity based resistance (e.g. a weight stack or weight plates), elastic resistance, fly wheel resistance, pneumatic resistance or any other type of resistance known in the art.

Optionally, the back exercise machine 100 may further comprise a display 188 allowing the user to measure the force being applied in real time. The display 188 is mounted to the elongated column member 140 of the foot support frame 138 by a display support member.

According to one embodiment, the back exercise machine may further include a seat belt for securing the user to the seat pad 126.

According to one embodiment, the first, second and third pivot axes are different from each other.

Formats

This approach can be used with varied sources of resistance including isokinetic (pictured), weight stacks, elastic bands, weight plates, and manually applied resistance.

This novel mechanical approach is necessary for the accurate electronic testing of production of the isolated spinal muscles as well.

This approach can also be used for the performance of exercise for each section of the spine including the cervical, thoracic, and lumbar regions. Resistance can be provided in vectors that directly load and exercise the spinal extensors and spinal flexors.

One or more of the components and functions illustrated in FIGS. 2-7 may be rearranged and/or combined into a single component or embodied in several components without departing from the invention. Additional elements or components may also be added without departing from the invention. Additionally, the features described herein may be implemented in software, hardware, as a business method, and/or combination thereof.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:

1. A back exercise machine, comprising:
a main frame having a base section;
a user support mounted on the main frame, the user support comprising a seat frame having a seat pad secured thereon;
a back frame mounted on the main frame and connected to the user support, the back frame comprising:
 a first vertical support member extending vertically upward from the base section;
 a second vertical support member extending vertically upward from the base section; and
 a back frame cross member connecting upper ends of the first and second vertical support members;
a back extension assembly pivotally mounted to the back frame, the back extension assembly comprising:
 a first arm pivotally mounted to the upper end of the first vertical support member;
 a second arm pivotally mounted to the upper end of the second vertical support member, the first and second arms connected by a back extension horizontal member and pivotally rotate around a first pivot axis;
 a first side plate having a first end of the first side plate and a second end of the first side plate, the first side plate pivotally mounted to a first end of the first arm;
 a second side plate having a first end of the second side plate and a second end of the second side plate, the second side plate pivotally mounted to a first end of the second arm, the first and second side plates rotate around a second pivot axis;
 a first supporting plate pivotally mounted to the second end of the first side plate;
 a second supporting plate pivotally mounted to the second end of the second side plate; and
 a back support horizontal member connecting the first and second supporting plates, the first and second supporting plates rotate around a third pivot axis; and
a resistance assembly mounted on the main frame and connected to the back extension assembly for producing multiaxial movement of the back extension assembly; and
wherein the first supporting plate includes a first supporting plate slot adapted to receive a first supporting plate protrusion extending outwardly from the first side plate of the back extension assembly, the first supporting plate protrusion moves within the first supporting plate slot allowing the first supporting plate to pivotally rotate around the third pivot axis.

2. The machine of claim 1, wherein the base section comprises first, second and third parallel base struts connected by a first cross member; a first connecting member extending at an angle from an end of the first base strut to the second base strut; and a second connecting member extending at an angle from an end of the third base strut to the second base strut.

3. The machine of claim 2, further comprising a foot support frame mounted to a front end of the second base strut, the foot support frame comprises:
an elongated column extending rearwardly and upwardly from the front end of the second base strut; and
a plurality of foot restraining roller extending perpendicularly outward from opposing side of the elongated column.

4. The machine of claim 3, further comprising:
a display support member mounted to the elongated column member of the foot support frame; and
a display secured to the display support member.

5. The machine of claim 2, wherein the first and second vertical support member extend upwardly from the first cross member of the base section.

6. The machine of claim 1, wherein the seat frame comprises:
a first seat support member, having a first end and a second end, extending upwardly and outwardly from the main frame where the first end is mounted to the main frame and the second end is mounted to the back frame; and
a second seat support member extending outwardly from the first seat support member, the seat pad mounted on the second seat support member.

7. The machine of claim 6, wherein in the second seat support member is adjustable along the length of the first seat support member.

8. The machine of claim 1, wherein the first side plate includes a first slide plate slot adapted to receive a first side plate protrusion extending outwardly from the first arm of the back extension assembly, the first side plate protrusion moves within the first side plate slot allowing the first side plate to pivotally rotate around the second pivot axis.

9. The machine of claim 1, wherein the second side plate includes a second side plate slot adapted to receive a second side plate protrusion extending outwardly from the second arm of the back extension assembly, the second side plate protrusion moves within the second side plate slot allowing the second side plate to pivotally rotate around the second pivot axis.

10. The machine of claim 1, wherein the second supporting plate includes a second supporting plate slot adapted to receive a second supporting plate protrusion extending outwardly from the second side plate of the back extension assembly, the second supporting plate protrusion moves within the second supporting plate slot allowing the second supporting plate to pivotally rotate around the third pivot axis.

11. The machine of claim 1, wherein the resistance assembly comprises:
a linear actuator having a cylinder and a piston axially engaged with the cylinder;
a motor secured to, and in electrical communication with, the linear actuator; and
wherein the piston is attached to a lever connected to the first arm of the back extension assembly.

12. The machine of claim 1, further comprising:
a first handle secured to the first end of the first side plate; and
a second handle secured to the first end of the second side plate.

13. A back exercise machine, comprising:
a main frame having a base section;
a user support mounted on the main frame, the user support comprising a seat frame having a seat pad secured thereon;
a back frame mounted on the main frame and connected to the user support, the back frame comprising:
    a first vertical support member extending vertically upward from the base section;
    a second vertical support member extending vertically upward from the base section; and
    a back frame cross member connecting upper ends of the first and second vertical support members;
a back extension assembly pivotally mounted to the back frame, the back extension assembly comprising:
    a first arm pivotally mounted to the upper end of the first vertical support member;
    a second arm pivotally mounted to the upper end of the second vertical support member, the first and second arms connected by a back extension horizontal member and pivotally rotate around a first pivot axis;
    a first side plate having a first end of the first side plate and a second end of the first side plate, the first side plate pivotally mounted to a first end of the first arm;
    a second side plate having a first end of the second side plate and a second end of the second side plate, the second side plate pivotally mounted to a first end of the second arm, the first and second side plates rotate around a second pivot axis;
    a first supporting plate pivotally mounted to the second end of the first side plate;
    a second supporting plate pivotally mounted to the second end of the second side plate; and
    a back support horizontal member connecting the first and second supporting plates, the first and second supporting plates rotate around a third pivot axis; and
a resistance assembly mounted on the main frame and connected to the back extension assembly for producing multiaxial movement of the back extension assembly, the resistance assembly comprises:
    a linear actuator having a cylinder and a piston axially engaged with the cylinder;
    a motor secured to, and in electrical communication with, the linear actuator; and
    wherein the piston is attached to a lever connected to the first arm of the back extension assembly; and
wherein the first supporting plate includes a first supporting plate slot adapted to receive a first supporting plate protrusion extending outwardly from the first side plate of the back extension assembly, the first supporting plate protrusion moves within the first supporting plate slot allowing the first supporting plate to pivotally rotate around the third pivot axis.

14. The machine of claim 13, wherein the first and second vertical support member extend upwardly from the first cross member of the base section.

15. The machine of claim 14, further comprising a foot support frame mounted to a front end of the second base strut, the foot support frame comprises:
an elongated column extending rearwardly and upwardly from the front end of the second base strut; and
a plurality of foot restraining roller extending perpendicularly outward from opposing side of the elongated column.

16. The machine of claim 13, wherein the base section comprises first, second and third parallel base struts connected by a first cross member; a first connecting member extending at an angle from an end of the first base strut to the second base strut; and a second connecting member extending at an angle from an end of the third base strut to the second base strut.

17. The machine of claim 13, wherein the first side plate includes a first slide plate slot adapted to receive a first side plate protrusion extending outwardly from the first arm of the back extension assembly, the first side plate protrusion moves within the first side plate slot allowing the first side plate to pivotally rotate around the second pivot axis.

18. The machine of claim 13, wherein the second side plate includes a second side plate slot adapted to receive a second side plate protrusion extending outwardly from the second arm of the back extension assembly, the second side plate protrusion moves within the second side plate slot allowing the second side plate to pivotally rotate around the second pivot axis.

19. The machine of claim 13, wherein the second supporting plate includes a second supporting plate slot adapted to receive a second supporting plate protrusion extending outwardly from the second side plate of the back extension assembly, the second supporting plate protrusion moves within the second supporting plate slot allowing the second supporting plate to pivotally rotate around the third pivot axis.

20. The machine of claim 13, further comprising:
a first handle secured to the first end of the first side plate; and
a second handle secured to the first end of the second side plate.

* * * * *